United States Patent [19]

Purcell

[11] Patent Number: 5,004,871
[45] Date of Patent: Apr. 2, 1991

[54] DIGITIZER STYLUS HAVING SIDE SWITCH

[75] Inventor: Alexander M. Purcell, Guilford, Conn.

[73] Assignee: Summagraphics Corporation, Seymour, Conn.

[21] Appl. No.: 436,196

[22] Filed: Nov. 13, 1989

[51] Int. Cl.⁵ .............................................. G08L 21/00
[52] U.S. Cl. .................................................... 178/18
[58] Field of Search ............................... 178/18, 19, 20

[56] References Cited

U.S. PATENT DOCUMENTS

| | | | |
|---|---|---|---|
| D. 294,263 | 2/1988 | Rodgers et al. | D19/36 |
| 3,462,548 | 8/1969 | Rinder | 382/13 |
| 3,528,295 | 11/1970 | Johnson et al. | |
| 4,263,592 | 4/1981 | Takahashi et al. | 340/707 |
| 4,491,688 | 1/1985 | Schaub et al. | 178/18 |
| 4,532,376 | 7/1985 | Rockwell | 178/18 |
| 4,542,261 | 9/1985 | Behnke | 178/18 |
| 4,580,007 | 4/1986 | Searby et al. | 178/18 |
| 4,638,119 | 1/1987 | Blesser et al. | 178/19 |
| 4,654,648 | 3/1987 | Herrington et al. | 340/710 |
| 4,672,154 | 6/1987 | Rodgers et al. | 178/19 |
| 4,695,680 | 9/1987 | Kable | 178/19 |
| 4,697,050 | 9/1987 | Farel et al. | 178/18 |
| 4,704,501 | 11/1987 | Taguchi et al. | 178/19 |
| 4,707,571 | 11/1987 | Clements et al. | 178/18 |
| 4,786,764 | 11/1988 | Padula et al. | 178/18 |
| 4,786,765 | 11/1988 | Yamanami et al. | 178/19 |
| 4,806,707 | 2/1989 | Landmeier | 178/18 |

Primary Examiner—Stafford D. Schreyer
Attorney, Agent, or Firm—Rosen, Dainow & Jacobs

[57] ABSTRACT

A stylus having a pressure sensitive side switch for use with digitizer apparatus is disclosed. The pressure sensitive side switch is activated by the application of pressure thereto substantially normal to the axis of the stylus by the finger of a user. In the illustrated embodiments, the pressure sensitive switch comprises a movable element, and the switch provides a signal related to movement of the movable element substantially normal to the stylus axis. The switch output in the preferred embodiment is linearly related to movement of the movable element. The switch may comprise a magnet and a Hall-effect device mounted in the stylus for movement relative to each other. The pressure sensitive side switch may be used to control line width, coloring, gray scaling, Z-axis input, etc.

27 Claims, 2 Drawing Sheets

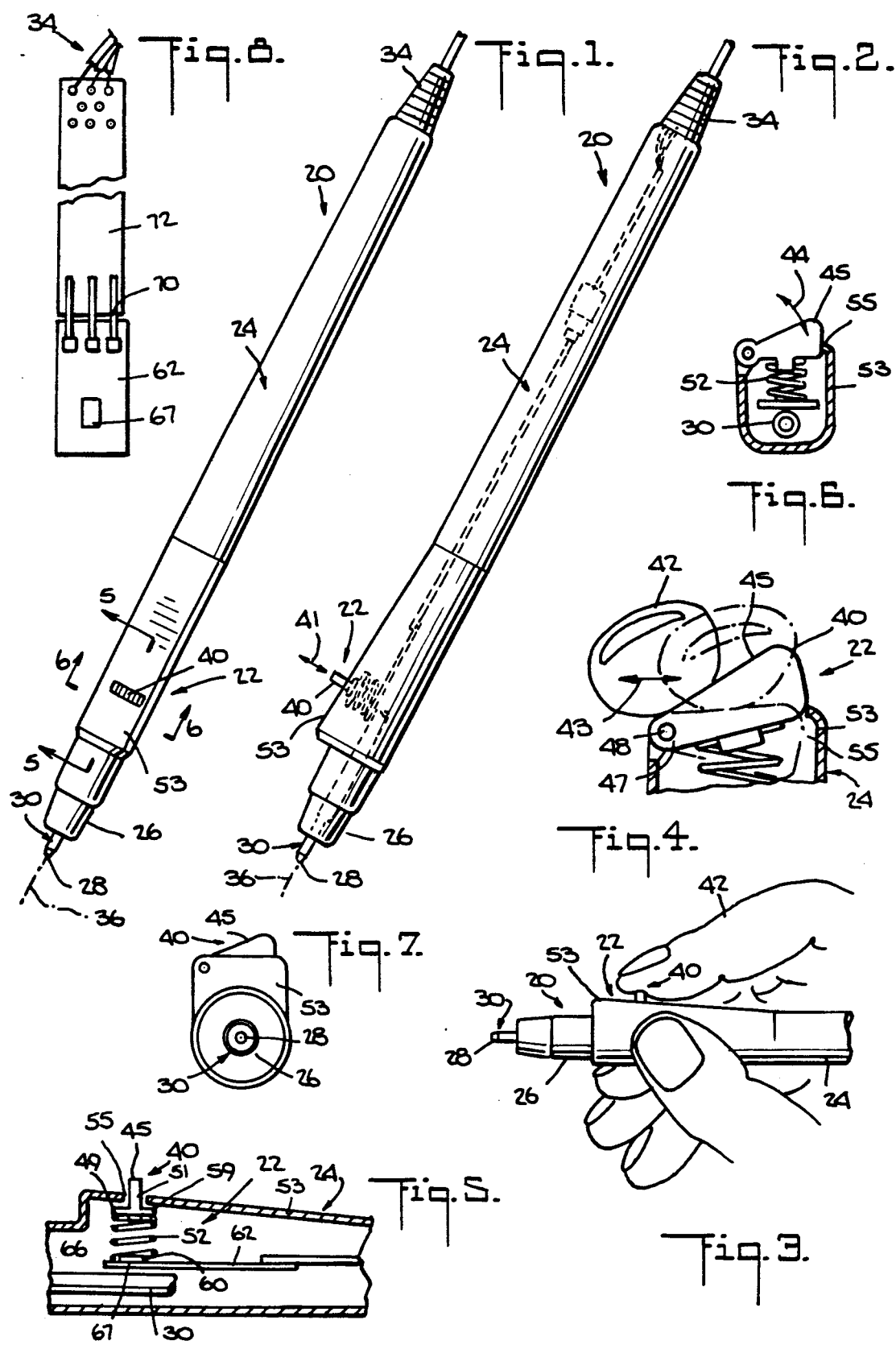

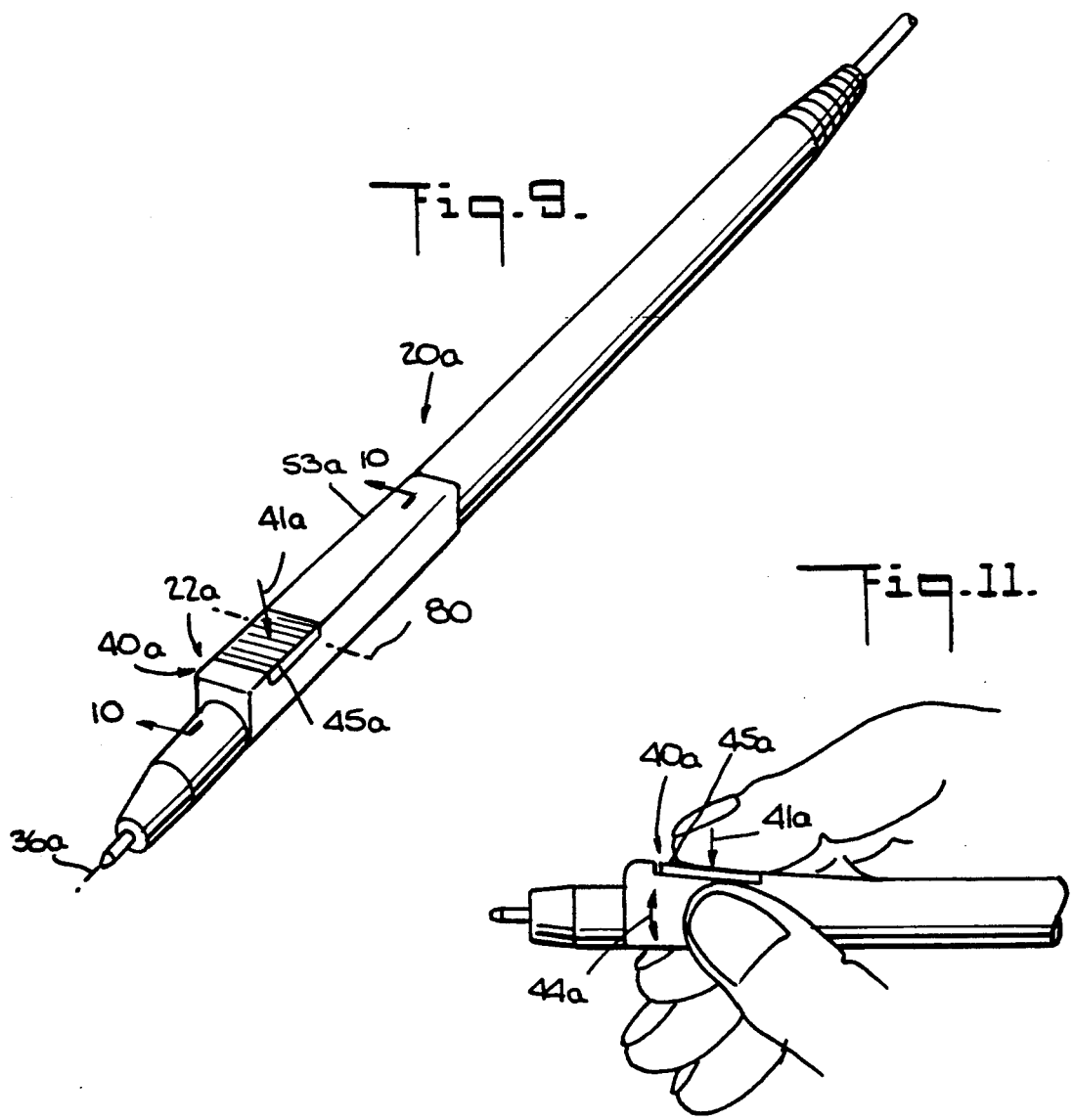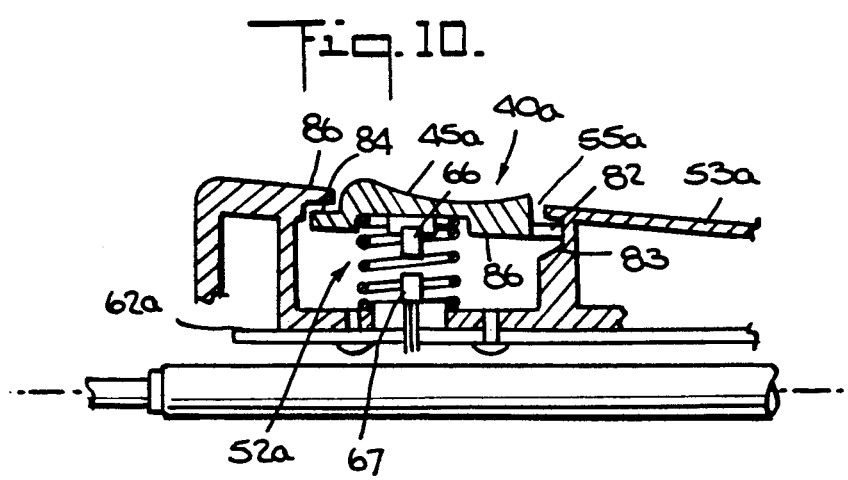

DIGITIZER STYLUS HAVING SIDE SWITCH

BACKGROUND OF THE INVENTION

The present invention relates to a stylus, for use with digitizer or like apparatus, having a switch which may be used to control a digitizer, graphic or like function.

Digitizer and like apparatus include a digitizing surface or tablet, circuitry and components associated with the digitizer surface or tablet and a stylus or cursor which interact such that the circuitry provides a digitized signal representing the position of the stylus or cursor on the digitizing surface or tablet. Stylii, for use with digitizers and like apparatus, having a pressure sensitive device activated axially of the stylus housing are know. An example of such a stylus is disclosed in U.S. Pat. No. 4,786,764 (Padula et al.), assigned to the assignee of this application. In the use of that type of stylus, the operator grasps the stylus housing similar to the manner in which a writing instrument is grasped, and activates the pressure sensitive device by forcing the tip of the stylus against the digitizer tablet or surface. Line thickness, for example, may be a graphic function controlled by the pressure sensitive device in cooperation with a graphics applications program such as CAD and a computer.

SUMMARY OF THE INVENTION

It is an object of the present invention to improve control of a parameter or function, typically provided with a digitizer-type device, using a stylus-type device.

It is another object of the present invention to improve the ergonomics of such a stylus-type device.

The above and other objects are achieved by the invention disclosed herein which provides a stylus-type device having a variable switch, e.g., a pressure-sensitive switch, which may be activated or controlled by application of force or pressure to the switch transversely of the stylus.

A stylus according to the invention comprises an elongated housing and a device having an element responsive to pressure or force applied thereto transversely of the housing to provide an output having more than two values related to the magnitude of such applied pressure or force. Preferably, the device provides an output which is linearly related to the applied pressure or force magnitude.

According to one embodiment, the device comprises means mounting the element for movement transversely of the housing, and the device provides an output related to the distance the movable element is move transversely of the housing, e.g., substantially normally to the axis of the stylus. Preferably such means resiliently mount the movable element to the housing such that the element returns to a rest position when the application of the pressure or force ceases.

In the illustrated embodiments, the device includes a magnet and a Hall-effect device, one of which is coupled to the movable element to move upon movement of the movable element and the other of which is held stationary relative to the stylus.

In the illustrated embodiments, the mounting means resiliently, pivotally mounts the movable element to the housing for movement transversely of the housing, and the movable element carries the magnet.

The invention also encompasses a method of controlling a digitizer-type function by the application of finger pressure transversely of the stylus.

A stylus incorporating the present invention is not subjected to unwanted movements because of wrist or arm movements used in conventional apparatus to activate a pressure sensitive switch. Moreover, a stylus incorporating the present invention is largely unaffected vis-a-vis the function controlled by the pressure sensitive switch by textured or uneven surfaces over which the stylus tip is passed.

The output of the pressure sensitive switch may be supplied to a digitizer-type apparatus, and may be used to control line width, coloring, gray scaling, Z-axis input, etc. in cooperation with a graphics application program such as CAD and a computer, and has particular applicability to calligraphic lettering.

BRIEF DESCRIPTION OF THE DRAWINGS

The invention is illustrated by way of example and not limitation in the figures of the accompanying drawings in which like references denote like or corresponding parts, and in which:

FIG. 1 is a perspective view of a stylus incorporating the present invention;

FIG. 2 is a perspective view of the stylus of FIG. 1 rotated 90° therefrom;

FIGS. 3 and 4 are perspective and side views, respectively, of a portion of the stylus of FIG. 1 illustrating operation of a pressure sensitive switch incorporated into the stylus;

FIG. 5 is a sectional view of the stylus of FIG. 1 taken along line 5—5 thereof;

FIG. 6 is a sectional view of the stylus of FIG. 1 taken along line 6—6 thereof;

FIG. 7 is a front view, tip-end view of the stylus of FIG. 1;

FIG. 8 is a diagram of PC boards within the stylus, one of which mounts part of the switch incorporated into the stylus of FIG. 1;

FIG. 9 is a perspective view of a stylus incorporating another embodiment of the invention;

FIG. 10 is a sectional view of the stylus of FIG. 9 taken along line 10—10 thereof; and FIG. 11 is a diagram illustrating operation of a pressure sensitive switch incorporated into the stylus of FIG. 9.

DESCRIPTION OF THE PREFERRED EMBODIMENTS

Stylus 20 in accordance with the embodiment of the invention depicted in FIGS. 1 and 2 incorporates a pressure-sensitive side switch 22 in accordance with the invention. Stylus 20 includes an elongated, tubular housing 24 in which are mounted near end 26 sensing or transmitting components such as inductive or capacitance components (not shown). Such components in the stylus interact with components in a device (not shown) such as a digitizer tablet having a surface (digitizing surface) whose coordinates adjacent the stylus tip are identified or digitized in conventional manner.

Stylus 20 also may incorporate a conventional switch (not shown) which is closed when the tip 28 of a pen refill 30 is pressed against the digitizing surface. That switch may be mechanical, membrane, optical, magnetic (e.g., Hall-effect), etc. Cable assembly 34 of stylus 20 connects the stylus to the digitizer device, or a computer, etc. (not shown).

Referring to FIGS. 1-4, pressure-sensitive side switch 22 is activated by a force or pressure applied from the side of housing 24, transversely, i.e., substantially perpendicular to the longitudinal axis or center line 36 of stylus 20. Switch 22 includes a movable element 40 which may be depressed normal to axis 36 (arrow 41 in FIG. 2) of stylus 20 to activate switch 22. As depicted in FIGS. 3 and 4, a user grasps stylus 20 as he or she would grasp a writing instrument, and with the index finger 42 presses movable element 40 inwardly, i.e., normal to axis 36. Movable element 40 is spring loaded so that it pivots outwardly to its rest position when pressure is released. Thus, movable element 40 moves in both directions along arrow 41 (FIG. 2). As described below, movable element 40 is pivoted so that it also moves circumferentially along arrow 44 (FIG. 6) in response to a side movement of the index finger 42 (arrow 43 in FIG. 4).

Referring to FIGS. 4-6, the top 45 (FIG. 4) of movable element 40 is contoured to form a button or key cap which is pivoted at one end 47 thereof to stylus housing 24 by pivot 48. Movable element 40 is retained connected to housing 24 by a flange 49 connected to top 45 by a depending portion 51 and a coil spring 52 urging movable member 40 outwardly. The axis of pivot 48 is generally parallel to the axis 36 of stylus 20. Housing 24 includes in an enlarged diameter portion 53 near stylus end 26 a circumferential slot 55 through which depending portion 51 of movable element 40 extends. Slot 55 and flange 49 are relatively sized so that movable element 40 is retained within housing portion 53 movable relative to slot 55.

Coil spring 52 extends between seats 59 and 60 on flange 49 and a PC board 62 mounted in housing portion 53, respectively. Spring 52 urges movable element 40 outwardly, i.e., counterclockwise with reference to FIG. 3. The combination of pivot 48 and spring 52 resiliently supports movable element 40 while permitting it to be depressed in a direction substantially normal to stylus axis 36. Seats 59, 60 comprise projections on flange 49 and PC board 62 around which opposed ends of spring 52 extend and engage.

Switch 22 includes a magnet 66 and a Hall-effect device or sensor 67 movably mounted relative to each another, i.e., one is carried by movable element 40 and the other is mounted to PC board 62. In the illustrated embodiment, movable member 40 carries magnet 66 and PC board 62 holds hall-effect device 67, although such mounting may be reversed. Magnet 66 and Hall-effect device 67 operate in known manner, with Hall-effect device 67 providing a signal which varies in accordance with the separation therefrom of magnet 66. Thus, the combination of magnet 66 and hall-effect device 67 provide a pressure sensitive switch having an output that varies with the pressure or force applied to movable member 40 substantially normal to stylus axis 36.

Referring to FIGS. 5 and 6, stylus housing portion 53 is enlarged to accommodate switch 22 while at the same time permitting pen refill 30 to pass therethrough. For aesthetics and ergonomics, the diameter of housing position 53 is gradually increased in the direction of end 26, reaching a maximum near movable element 40.

Referring to FIG. 8, PC board 62 to which Hall-effect device 67 is mounted, is coupled by conductors 70 to a main PC board 72 containing circuitry and components conventionally carried by a stylus. Cable assembly 34 is connected to PC board 72.

The output of Hall-effect device 67 may be linearized by circuits known in the art, which may be mounted on PC board 62, PC board 72 or externally of stylus 20. Such a linearizing circuit may comprise, for example, an analog-to-digital (A/D) converter coupled to receive the Hall-effect-device output, an input/output device coupled to the A/D converter and a microprocessor coupled to the input/output device including a read only memory (ROM) containing a linearizing look-up table or transfer function routine. The output of hall-effect device 67 may also be linearized using an operational amplifier having an appropriate transfer function. Another way in which the output of a Hall-effect device 67 may be linearized is by using two magnets and suspending the Hall-effect device therebetween. The foregoing approaches for linearizing the output of a Hall-effect device are known in the art. For example, a Hall-effect integrated circuit chip having a linear output is available from Microswitch Division of Honeywell Corp. as model SS9. Magnet 66 is conventional and is available, for example, from Hitachi Magnetics Corp.

Referring next to FIGS. 9-11, another embodiment of a stylus 20a incorporating a pressure sensitive side switch 22a is shown. Similar to the embodiment of FIG. 1, side switch 22a is mounted for movement substantially perpendicular to the axis 36a of stylus 22a, and is pivotably mounted to an increased diameter portion 53a of stylus 22a. In the embodiment of FIGS. 9-11, movable element 40a is mounted to pivot on axis 80 (FIG. 9) perpendicular to the longitudinal axis 36a of stylus 20a. Like switch 22, switch 22a includes a top 45a contoured in the form of a button or key cap which carries a magnet 66. Moveable element 40 is pivoted to housing portion 53a through opening 55a by a projection 82 on one side of movable element 40a which is received in a notch 83 in housing portion 53a. The opposite side of movable element 40a includes a projection 84 which engages with a lip 86 in housing portion 53a under the urging of coil spring 52a to retain movable element movably captivated in housing portion 53a.

Coil spring 52a a seated on the bottom 86 of movable element 40a and on PC board 62a by means of projections as described above for switch 22. Hall-effect device 67 is mounted on PC board 62a and interacts with magnet 66 as described above for switch 22a. The output of Hall-effect device 67 may be linearized as described above. Switch 22a is otherwise generally as described for switch 22, and stylus 20a is otherwise generally as described above for stylus 20.

In the embodiment of FIG. 1, movement of the user's index finger to the left or right will hold the movable element 40 firmly against the housing portion of the stylus within the narrow slot 55, and in the embodiment of FIGS. 8-10, movement of the user's index finger up and down (axially) will hold the movable element firmly within opening 55a.

In the embodiments described above, a magnet and Hall-effect device constitute the active part of pressure sensitive switch 22, 22a. However, other devices may be used which provide an output that varies in a given range according to a given relationship with pressure applied to a movable element or a part of the switch. For example, switch 22,22a may be embodied by a strain gauge device, a piezoelectric device, a pressure sensitive film or ink, an optical position detector, micromachined/etched silicon sensors, etc.

Unlike conventional-tip, pressure sensitive stylii, a side pressure sensitive stylus in accordance with the invention is not subjected to unwanted changes of pressure because of wrist and arm movements required to activate conventional switches and is substantially not affected by pressing on varying surface textures. A movable element which is depressed normal to the longitudinal axis of the stylus by, for example, pivoting as disclosed herein, provides stability for various positions of the switch.

The output of the pressure sensitive switch 22,22a may be supplied to digitizer or like apparatus via cable harness 34, and may be used to control the magnitude of a voltage or signal for a variety of functions, including coloring or shading, line intensity, Z-axis control, etc. In the preferred embodiments, pressure sensitive switch 22, 22a is used to control gray scaling, and may advantageously be used for calligraph lettering, especially copper-plate lettering. Thus, a user may easily move pressure switch 22, 22a solely by the index finger and need not use wrist or arm action which could subject the stylus to unwanted movement.

Although the invention has been described with reference to presently preferred embodiments, it will be apparent to one skilled in the art that variations and modifications may be made within the spirit and scope of the invention. For example, as discussed above, the pressure sensitive switch may be constituted by other than a magnet and Hall-effect device, and movable element 40, 40a may be mounted in other ways, and parameters other than those mentioned may be controlled. Also, the stylus may be used in different type digitizers and other electrovideographic devices, e.g., electromagnetic, capacitance, magnetostrictive, resistive, optical, sonic, CRT, light pen, etc. It is to be understood that the drawings and description of the preferred embodiments are made by way of example rather than to limit the scope of the invention, and it is intended to cover within the spirit and scope of the invention all such changes and modifications.

What is claimed is:

1. A stylus comprising an elongated housing and a device responsive to pressure or force applied thereto transversely of said housing to provide an output related to the magnitude of such applied pressure or force.

2. The stylus of claim 1 wherein said device provides an output which is linearly related to said applied pressure or force magnitude.

3. The stylus of claim 1 wherein said device comprises a movable element and means mounting said element for movement transversely to said housing, and said device provides an output related to the distance said movable element is moved transversely of said housing.

4. The stylus of claim 3 wherein said device includes a magnet and a Hall-effect device, one of which is coupled to said movable element to move upon movement of said movable element and the other of which is held stationary relative to said stylus.

5. The stylus of claim 3 including means resiliently mounting said movable element to said housing such that said element returns to a rest position when the application of said pressure or force ceases.

6. The stylus of claim 3 including means pivotally mounting said movable element to said housing for movement transversely of said housing.

7. The stylus of claim 6 wherein said means for pivotally mounting said movable element for pivoting on an axis which is substantially parallel to a longitudinal axis of said stylus.

8. The stylus of claim 6 wherein said means for pivotally mounting said movable element for pivoting on an axis which is substantially normal to a longitudinal axis of said stylus.

9. A stylus comprising an elongated housing and a device having an element mounted for resilient movement transveresly to said housing, said device providing an output related to movement of said movable element transversely to said housing.

10. The stylus of claim 9 wherein said device provides an output which is linearly related to the distance which said movable element moves.

11. The stylus of claim 9 wherein said device comprises a magnet and a Hall-effect device, one of which is coupled to said movable element to move upon movement of said movable element and the other of which is held stationary relative to said stylus.

12. A stylus comprising an elongated housing and a pressure-sensitive device, said housing having a longitudinal axis and said device having a movable element mounted for resilient movement transversely to said axis, said device providing an output related to movement of said movable element transversely to said axis.

13. The stylus of claim 12 wherein said device provides an output which is linearly related to the distance which said movable element moves.

14. The stylus of claim 12 wherein said device comprises a magnet and a Hall-effect device, one of which is coupled to said movable element to move upon movement of said movable element and the other of which is held stationary relative to said stylus.

15. A method of controlling a variable parameter of a digitizer or like apparatus from a stylus which cooperates with said digitizer device, comprising
mounting a pressure sensitive device to said stylus which is activated by force or pressure applied transversely of said stylus and provides an output related to said force or pressure applied thereto transversely of said stylus, and
providing the output of said device to said digitizer apparatus or to apparatus associated therewith.

16. A stylus comprising an elongated housing and a device having an element responsive to pressure or force applied thereto transversely of said housing to provide an output which varies in a given range according to a given relationship with the magnitude of such applied pressure or force.

17. The stylus of claim 16 wherein said device provides an output which within said given range aries according to a linear relationship with said applied pressure or force magnitude.

18. The stylus of claim 16 wherein said device comprises means mounting said element for movement transversely to said housing, and said device provides an output which varies according to the distance said movable element is moved transversely of said housing.

19. The stylus of claim 18 wherein said device includes a magnet and a Hall-effect device, one of which is coupled to said movable element to move upon movement of said movable element and the other of which is held stationary relative to said stylus.

20. The stylus of claim 18 including means resiliently mounting said movable element to said housing such that said element returns to a rest position when the application of said pressure or force ceases.

21. The stylus of claim 18 including means pivotally mounting said movable element to said housing for movement transversely of said housing.

22. The stylus of claim 21 wherein said means for pivotally mounting said movable element for pivoting on an axis which is substantially parallel to a longitudinal axis of said stylus.

23. The stylus of claim 21 wherein said means for pivotally mounting said movable element for pivoting on an axis which is substantially normal to a longitudinal axis of said stylus.

24. A stylus comprising an elongated housing and a device responsive to pressure or force applied thereto transversely of said housing to provide an output having more than two values related to the magnitude of such applied pressure or force.

25. A stylus comprising an elongated housing and a device having an element mounted for resilient movement transversely to said housing, said device providing an output having more than two values related to movement of said movable element transversely to said housing.

26. A stylus comprising an elongated housing and a pressure-sensitive device, said housing having a longitudinal axis and said device having a movable element mounted for resilient movement transversely to said axis, said device providing an output having more than two values related to movement of said movable element transversely to said axis.

27. A method of controlling a variable parameter of a digitizer or like apparatus from a stylus which cooperates with said digitizer device, comprising mounting a pressure sensitive device to said stylus which is activated by force or pressure applied transversely of said stylus and provides an output having more than two values related to said force or pressure applied thereto transversely of said stylus, and providing the output of said device to said digitizer apparatus or to apparatus associated therewith.

* * * * *

UNITED STATES PATENT AND TRADEMARK OFFICE
CERTIFICATE OF CORRECTION

PATENT NO. : 5,004,871

DATED : April 2, 1991

INVENTOR(S) : ALEXANDER M. PURCELL

It is certified that error appears in the above-identified patent and that said Letters Patent is hereby corrected as shown below:

Column 1, line 17, change "know" to --known--.

Column 6, line 49, change "aries" to --varies--.

Signed and Sealed this

Twenty-third Day of February, 1993

Attest:

STEPHEN G. KUNIN

*Attesting Officer*      Acting Commissioner of Patents and Trademarks